US008390605B2

(12) United States Patent
Lin et al.

(10) Patent No.: US 8,390,605 B2
(45) Date of Patent: Mar. 5, 2013

(54) INTERFACE CIRCUIT AND METHOD FOR TRANSMITTING DATA THROUGH THE SAME

(75) Inventors: Chia-Liang Lin, Sinshih Township, Tainan County (TW); Kuang-Ting Cheng, Sinshih Township, Tainan County (TW)

(73) Assignee: Himax Technologies Limited (TW)

( * ) Notice: Subject to any disclaimer, the term of this patent is extended or adjusted under 35 U.S.C. 154(b) by 723 days.

(21) Appl. No.: 12/619,332

(22) Filed: Nov. 16, 2009

(65) Prior Publication Data

US 2011/0115755 A1 May 19, 2011

(51) Int. Cl.
*G06F 3/038* (2006.01)

(52) U.S. Cl. ........................................................ 345/204

(58) Field of Classification Search ........................ None
See application file for complete search history.

(56) References Cited

U.S. PATENT DOCUMENTS

| | | | | |
|---|---|---|---|---|
| 7,642,939 | B2 * | 1/2010 | Nanevicz | 341/101 |
| 2005/0185721 | A1 * | 8/2005 | Takeuchi | 375/257 |
| 2007/0002895 | A1 * | 1/2007 | Chan | 370/467 |

* cited by examiner

*Primary Examiner* — Christopher R Lamb
(74) *Attorney, Agent, or Firm* — Hayes Soloway P.C.

(57) ABSTRACT

An interface circuit includes a plurality of receivers, a multiplexer, a plurality of shift registers and a latch circuit. Each of the receivers receives one of a plurality of sub-pixel values in one time period. The multiplexer multiplexes the sub-pixel values received by the receivers. The shift registers corresponds to the receivers, and each of the shift registers temporarily stores at least one of the multiplexed sub-pixel values. The latch circuit receives the sub-pixel values temporarily stored in the shift registers according to a shift register signal. Under a selection mode, a number of the receivers are turned on to receive the sub-pixel values and the rest of the receivers are turned off. A method for transmitting data through an interface circuit is also disclosed herein.

15 Claims, 4 Drawing Sheets

INTERFACE CIRCUIT AND METHOD FOR TRANSMITTING DATA THROUGH THE SAME

BACKGROUND

1. Field of Invention

The present invention relates to an interface circuit. More particularly, the present invention relates to an interface circuit and a method for transmitting data through the interface circuit.

2. Description of Related Art

A variety of electronic devices utilize high-speed differential data transmission. Differential data transmission is commonly used for data transmission rates greater than 100 Mbps over long distances, as well as in transfer of data to various display monitors.

However, the conventional differential transmission interface circuit is only one of the 3-pair and 6-pair types. Thus, when the 3-pair type interface circuit receives data, it cannot receive 6-pair data, and vice versa. Accordingly, it is not flexible when utilizing the interface circuit and may increase the costs.

SUMMARY

In accordance with one embodiment of the present invention, an interface circuit is provided. The interface circuit includes a plurality of receivers, a multiplexer, a plurality of shift registers and a latch circuit. Each of the receivers receives one of a plurality of sub-pixel values in one time period. The multiplexer multiplexes the sub-pixel values received by the receivers. The shift registers corresponds to the receivers, and each of the shift registers temporarily stores at least one of the multiplexed sub-pixel values. The latch circuit receives the sub-pixel values temporarily stored in the shift registers according to a shift register signal. Under a selection mode, a number of the receivers are turned on to receive the sub-pixel values and the rest of the receivers are turned off.

In accordance with another embodiment of the present invention, a method for transmitting data through an interface circuit is provided. The method includes the steps of providing a plurality of receivers; turning on a number of the receivers to receive a plurality of sub-pixel values while turning off the rest of the receivers, under a selection mode; multiplexing the received sub-pixel values; temporarily storing the multiplexed sub-pixel values; and outputting the stored sub-pixel values according to a shift register signal.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference to the accompanying drawings as follows.

DESCRIPTION OF THE PREFERRED EMBODIMENTS

In the following detailed description, the embodiments of the present invention have been shown and described. As will be realized, the invention is capable of modification in various respects, all without departing from the invention. Accordingly, the drawings and description are to be regarded as illustrative in nature, and not restrictive.

Figure 1:
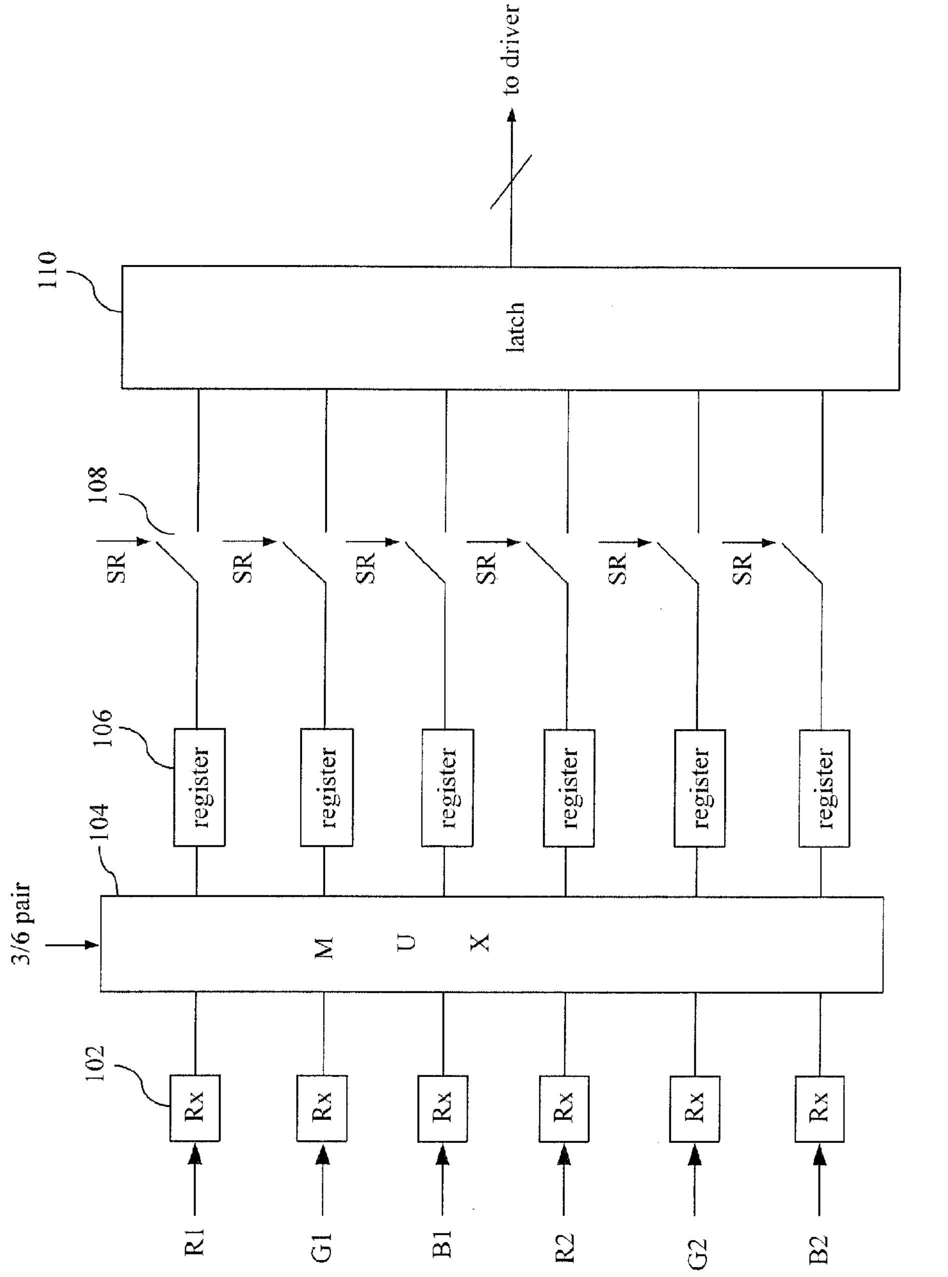
FIG. 1 illustrates a 3/6-pair type mini-LVDS interface circuit according to one embodiment of the present invention.
Figure 2:
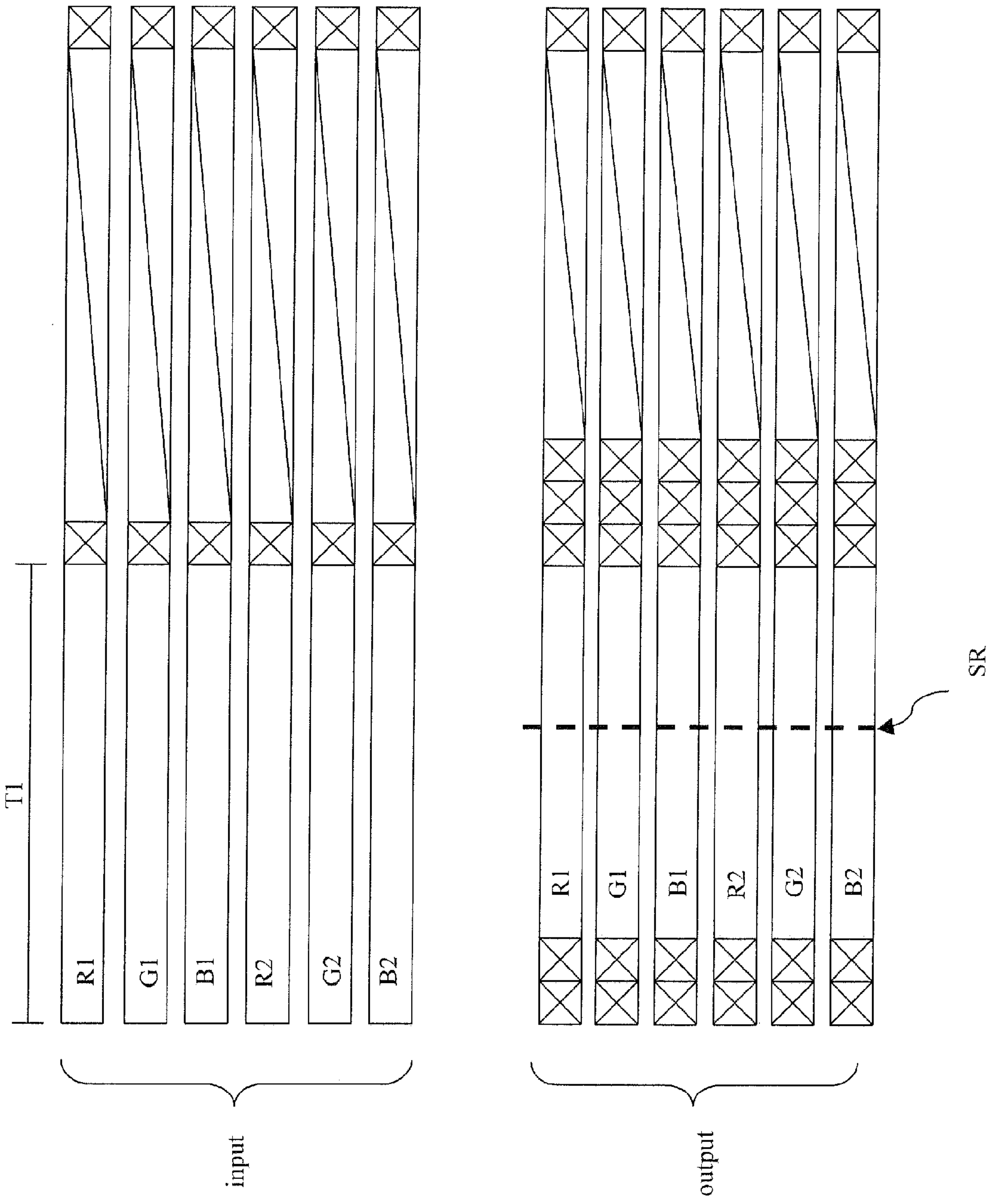
FIG. 2 illustrates a timing diagram of the sub-pixel values transmitted under the normal mode.

An interface circuit is provided in the present invention. The interface circuit includes a plurality of receivers, a multiplexer, a plurality of shift registers and a latch circuit. Each of the receivers receives one of a plurality of sub-pixel values in one time period. The multiplexer multiplexes the sub-pixel values received by the receivers. The shift registers corresponds to the receivers, and each of the shift registers temporarily stores at least one of the multiplexed sub-pixel values. The latch circuit receives the sub-pixel values temporarily stored in the shift registers according to a shift register signal. Under a selection mode, a number of the receivers are turned on to receive the sub-pixel values and the rest of the receivers are turned off. The interface circuit is a differential signaling interface circuit such as low voltage differential signaling (LVDS) interface circuit, bus LVDS (BLVDS) interface circuit, mini LVDS (mini-LVDS) interface circuit and reduced swing differential signaling (RSDS) interface circuit. A 3/6 pair type mini-LVDS interface circuit is taken for an example and discussed as follows. FIG. 1 illustrates a 3/6-pair type mini-LVDS interface circuit according to one embodiment of the present invention. The 3/6-pair type mini-LVDS interface circuit 100 includes six receivers (Rx) 102, a multiplexer (MUX) 104, a corresponding number of shift registers 106 and switches 108, and a latch circuit 110. Under a normal mode (or 6-pair mode), all of the receivers 102 are turned on to correspondingly receive the sub-pixel values (e.g. R1, G1, B1, R2, G2, B2, etc.) in one time period. FIG. 2 illustrates a timing diagram of the sub-pixel values transmitted under the normal mode. Refer to FIGS. 1 and 2. At first, all of the receivers 102 correspondingly receive the sub-pixel values R1, G1, B1, R2, G2 and B2 in the time period T1. Then, the multiplexer 104 simultaneously multiplexes the sub-pixel values received by the receivers 102. In one embodiment, the multiplexer 104 simultaneously processes the sub-pixel values received by all the receivers 102 according to a 6-pair mode signal. After the multiplexer 104 processes the sub-pixel values, the shift registers 106 correspondingly and temporarily store the sub-pixel values from the multiplexer 104. Afterwards, the temporarily stored sub-pixel values are simultaneously outputted through the switches 108 to the latch circuit 110 or the driver including the latch circuit 110 through the switches 108 according to the shift register signal SR.

Figure 3:
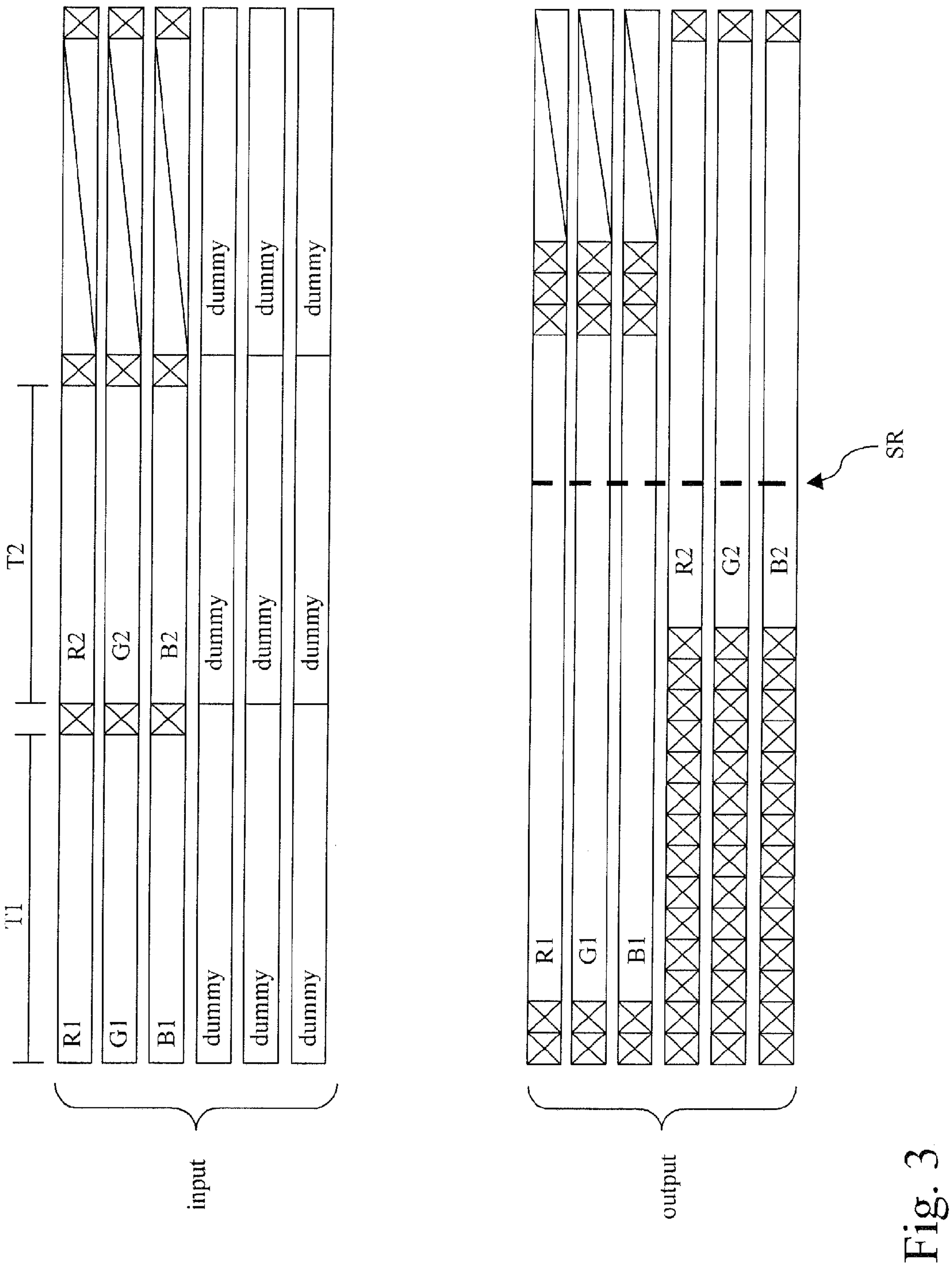
FIG. 3 illustrates a timing diagram of the sub-pixel values transmitted under the selection mode.

On the other hand, under the selection mode (or 3-pair mode), three of the receivers 102 are turned on and the rest of the receivers 102 are turned off. The other turn-off receivers 102 are thus deemed dummy receivers. FIG. 3 illustrates a timing diagram of the sub-pixel values transmitted under the selection mode. Refer to FIGS. 1 and 3. The turn-on receivers 102 correspondingly receive a same number of the sub-pixel values (e.g. R1, G1 and B1) as that of the turn-on receivers in a first time period T1. After that, the turn-on receivers 102 correspondingly receive another same number of the sub-pixel values (e.g. R2, G2 and B2) as that of the turn-on receivers 102 in a second time period T2 next to the first time period T1.

The sub-pixel values R1, G1 and B1 received in the first time period T1 are in advance multiplexed by the multiplexer 104, which may process the sub-pixel values according to a 3-pair mode signal, and separately stored in the three corresponding shift registers 106. After that, the sub-pixel values R2, G2 and B2 received in the second time period T2 are multiplexed by the multiplexer 104 and separately stored in the other three corresponding shift registers 106. Then, the sub-pixel values R1, G1, B1, R2, G2 and B2, received in the first time period T1 and the second time period T2 and stored in the shift registers 106 are simultaneously outputted to the latch circuit 110 or the driver including the latch circuit 110 through the switches 108 according to the shift register signal SR.

Notably, since the earlier received and processed sub-pixel values R1, G1 and B1 have to wait in the corresponding shift registers 106 until the later received and processed sub-pixel values R2, G2 and B2 are inputted into and stored in the other corresponding shift registers 106, the shift register signal SR in the 3-pair mode should be two times the period of the shift register signal SR in the 6-pair mode, such that the earlier received sub-pixel values R1, G1 and B1 and the later received sub-pixel values R2, G2 and B2 can be simultaneously outputted to the latch circuit 110 according to the shift register signal SR.

Accordingly, the 3/6-pair type mini-LVDS interface circuit 100 described above can be switched between the 3-pair mode and the 6-pair mode by controlling the receivers 102 and the shift registers 106 and arranging the transmitted data.

Figure 4:
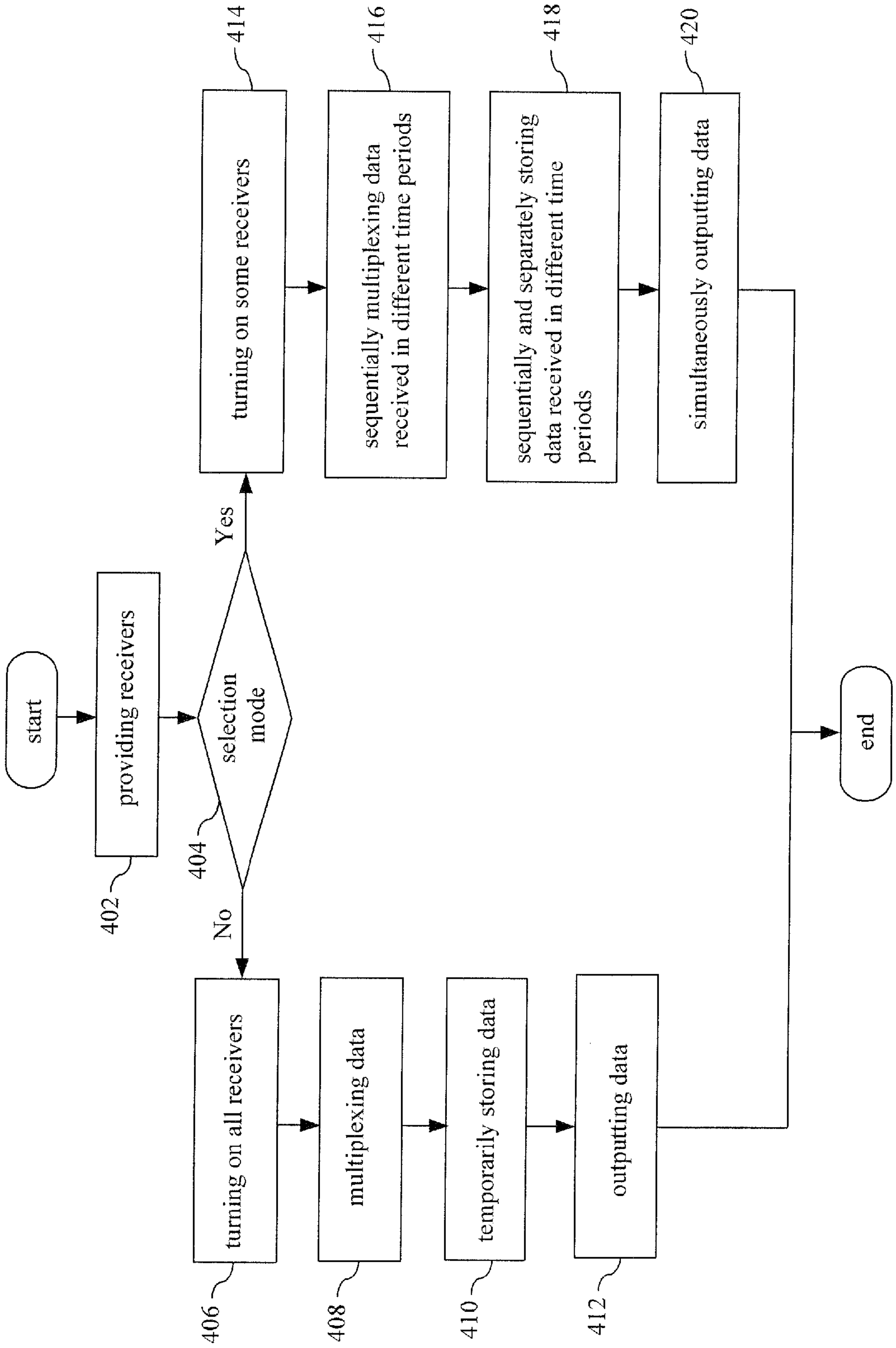
FIG. 4 illustrates a flow chart of a method for transmitting data through an interface circuit according to one embodiment of the present invention.

FIG. 4 illustrates a flow chart of a method for transmitting data through an interface circuit according to one embodiment of the present invention. First, a plurality of receivers are provided (Step 402). Then, whether the receivers are operated under a selection mode is determined (Step 404). When the receivers are not operated under the selection mode but a normal mode, all of the receivers (e.g. 6 receivers) are turned on to receive a plurality of sub-pixel values (Step 406), in which a same number of the sub-pixel values as that of the receivers are correspondingly received in one time period. After that, the received sub-pixel values are multiplexed (Step 408). Next, the multiplexed sub-pixel values are temporarily stored (Step 410). Afterwards, the stored sub-pixel values are outputted to, for example, a latch circuit or a driver, according to a shift register signal (Step 412).

On the other hand, when the receivers are operated under the selection mode, a number of the receivers (e.g. 3 receivers) are turned on to receive the sub-pixel values while the rest of the receivers are turned off (Step 414), in which a same number of the sub-pixel values as that of the turn-on receivers are correspondingly received in a first time period and another same number of the sub-pixel values as that of the turn-on receivers are correspondingly received in a second time period next to the first time period. After that, the sub-pixel values received in different time periods are sequentially multiplexed (Step 416); that is, the sub-pixel values received in the first time period are multiplexed in advance and then the sub-pixel values received in the second time period are multiplexed. Next, the sub-pixel values received in different time periods are sequentially and separately stored in the corresponding shift registers (Step 418); that is, the sub-pixel values received in the second time period are separately stored in the corresponding shift registers after the sub-pixel values received in the first time period are separately stored in the other corresponding shift registers. Afterwards, the stored sub-pixel values received in the first and second time period are simultaneously outputted according to the shift register signal (Step 420).

For the foregoing embodiments, the interface circuit and the method for transmitting data through the interface circuit can be flexibly utilized to transmit data under different pair modes. In addition, the number of data buses necessary for transmitting data can be thus saved and the costs can be accordingly reduced as well.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. An interface circuit, comprising:

a plurality of receivers each for receiving one of a plurality of sub-pixel values in one time period;

a multiplexer for multiplexing the sub-pixel values received by the receivers;

a plurality of shift registers corresponding to the receivers, each of the shift registers temporarily storing at least one of the multiplexed sub-pixel values; and a latch circuit receiving the sub-pixel values temporarily stored in the shift registers according to a shift register signal;

wherein under a selection mode a number of the receivers are turned on to receive the sub-pixel values and the rest of the receivers are turned off, the receivers correspondingly receive a same number of the sub-pixel values as that of the turn-on receivers in a first time period and correspondingly receive another same number of the sub-pixel values as that of the turn-on receivers in a second time period next to the first time period, and the sub-pixel values received in the second time period are multiplexed and separately stored in the corresponding shift registers after the sub-pixel values received in the first time period are multiplexed and separately stored in the other corresponding shift registers.

2. The interface circuit as claimed in claim 1, wherein the sub-pixel values received in the first and second time period are simultaneously output to the latch circuit from the shift registers according to the shift register signal.

3. The interface circuit as claimed in claim 1, wherein under the selection mode the number of the receivers receiving the sub-pixel values is 3.

4. The interface circuit as claimed in claim 1, wherein all of the receivers receive the sub-pixel values under a normal mode.

5. The interface circuit as claimed in claim 4, wherein under the normal mode the receivers correspondingly receive a same number of the sub-pixel values as that of the receivers in a third time period to be simultaneously multiplexed by the multiplexer, temporarily stored in the corresponding shift registers, and simultaneously output to the latch circuit according to the shift register signal.

6. The interface circuit as claimed in claim 4, wherein under the normal mode the number of the receivers receiving the sub-pixel values is 6.

7. The interface circuit as claimed in claim 1, wherein the interface circuit is a differential signaling interface circuit.

8. A method for transmitting data through an interface circuit, the method comprising:

providing a plurality of receivers;

turning on a number of the receivers to correspondingly receive a same number of the sub-pixel values as that of the turn-on receivers in a first time period and correspondingly receiving another same number of the sub-pixel values as that of the turn-on receivers in a second time period next to the first time period while turning off the rest of the receivers, under a selection mode;

multiplexing the sub-pixel values received in the second time period after multiplexing the sub-pixel values received in the first time period;

temporarily storing the multiplexed sub-pixel values; and outputting the stored sub-pixel values according to a shift register signal.

9. The method as claimed in claim 8, wherein the step of temporarily storing the multiplexed sub-pixel values further comprises:

separately storing the sub-pixel values received in the second time period in the corresponding shift registers after separately storing the sub-pixel values received in the first time period in the other corresponding shift registers.

10. The method as claimed in claim 9, wherein the step of outputting the temporarily stored sub-pixel values further comprises:

simultaneously outputting the stored sub-pixel values received in the first and second time period according to the shift register signal.

11. The method as claimed in claim 9, wherein under the selection mode the number of the receivers receiving the sub-pixel values is 3.

12. The method as claimed in claim 8, further comprising:

turning on all of the receivers to receive the sub-pixel values under a normal mode.

13. The method as claimed in claim 12, wherein the step of receiving the sub-pixel values by all of the receivers further comprises:

correspondingly receiving a same number of the sub-pixel values as that of the receivers in a third time period to be simultaneously multiplexed, temporarily stored, and simultaneously output according to the shift register signal.

14. The method as claimed in claim 12, wherein under the normal mode the number of the receivers receiving the sub-pixel values is 6.

15. An interface circuit, comprising:

a plurality of receivers each for receiving one of a plurality of sub-pixel values in one time period;

a multiplexer for multiplexing the sub-pixel values received by the receivers;

a plurality of shift registers corresponding to the receivers, each of the shift registers temporarily storing at least one of the multiplexed sub-pixel values; and a latch circuit receiving the sub-pixel values temporarily stored in the shift registers according to a shift register signal;

wherein under a selection mode a number of the receivers are turned on to receive the sub-pixel values and the rest of the receivers are turned off, all of the receivers receive the sub-pixel values under a normal mode, and under the normal mode the receivers correspondingly receive a same number of the sub-pixel values as that of the receivers in a third time period to be simultaneously multiplexed by the multiplexer, temporarily stored in the corresponding shift registers, and simultaneously output to the latch circuit according to the shift register signal.

* * * * *